Dec. 3, 1946.    J. W. DROLL    2,412,081
ELECTRODE JOINT
Filed Dec. 21, 1944
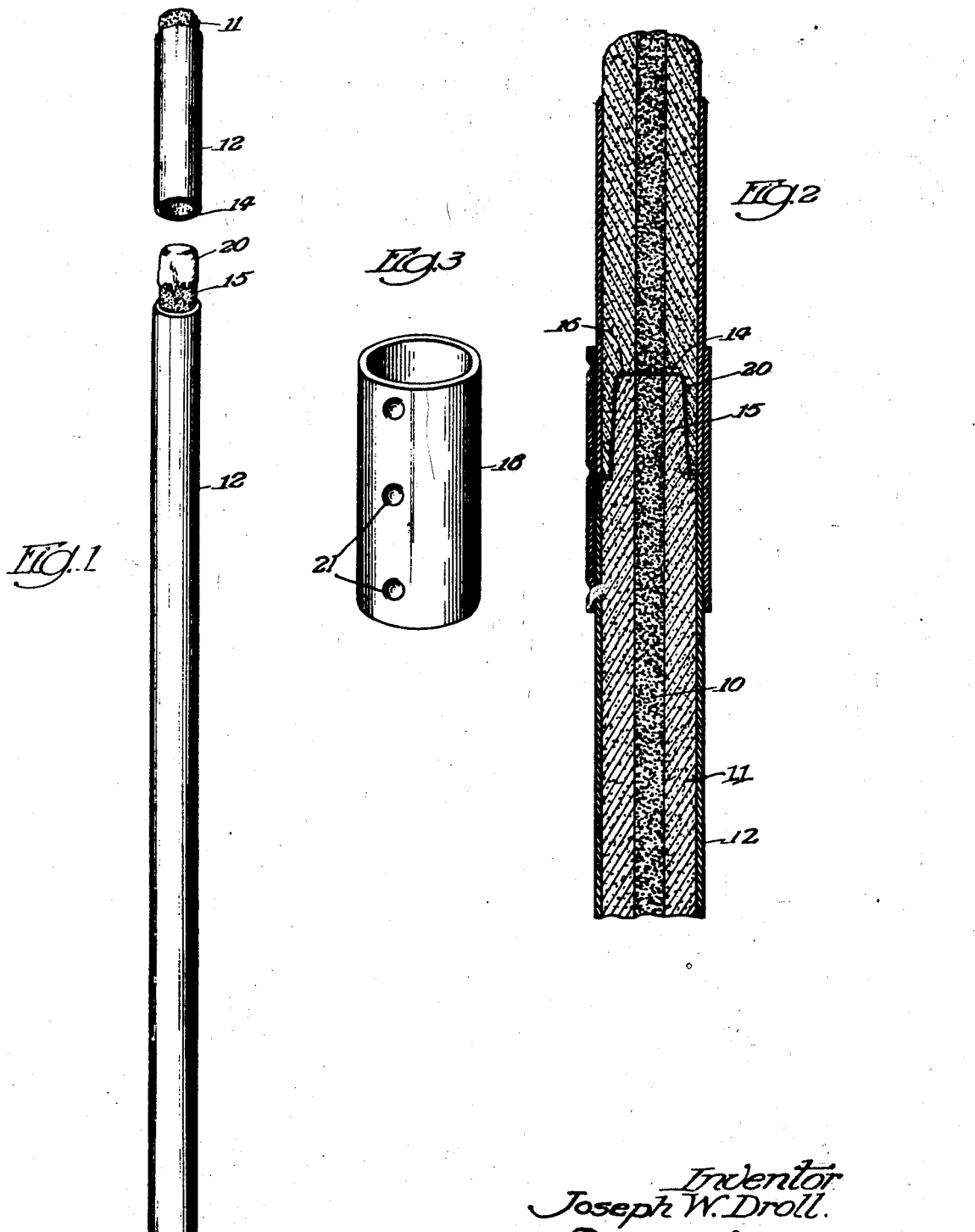
Inventor
Joseph W. Droll.

Patented Dec. 3, 1946

2,412,081

UNITED STATES PATENT OFFICE 2,412,081

ELECTRODE JOINT

Joseph W. Droll, Wilmette, Ill.

Application December 21, 1944, Serial No. 569,150

1 Claim. (Cl. 176—119)

The invention relates to carbon electrodes for picture projectors.

In a carbon electrode as set forth in Letters Patent No. 2,120,243 the telescopic ends of the carbon sticks with a metallic conductive coating therearound are connected in end-to-end relation by a conductive sleeve for continuous light projection. In practice it has been found that the coating of the telescopic ends on the carbon sticks leaves, in many instances, irregularities in the contacting surfaces between the contiguous ends of the sticks and that the pores in the contacting surfaces of the carbon sometimes cause flickering or irregularities in the projected light and that as the joined ends are consumed the short end of a nearly consumed stick becomes separated from the following stick during the projection of a picture.

The primary object of the invention is to provide in connection with a carbon electrode of the aforementioned character an improved joint which during continuous projection or use of the electrode will prevent flickering of the projected light and separation of the short end of a stick from a full length stick during projection, and which makes it possible to reduce the length of the telescopic ends of the sticks.

This object is achieved by bonding together by a suitable adhesive the telescopic ends of the carbon sticks in order to effect uniform continuous electrical conduction through the carbon in the sticks and a more efficient joint between the sticks.

Other objects will appear from the detailed description.

The invention consists in the various novel features which are hereinafter set forth and are more particularly defined by the claim at the conclusion hereof.

In the drawing:

Figure 1 is a perspective of a pair of electrode-sticks with the bonding resin applied to one of them preparatory to joining the telescopic ends of a partially consumed stick and a stick of normal length;

Figure 2 is a section on an enlarged scale of the joint between a partially used stick and a stick of normal length; and Figure 3 is a perspective of the sleeve.

The invention is exemplified in electrodes which are designed for use in the lamp house of a picture projector. Each carbon electrode for efficient illumination for picture projection comprises a stick consisting of a partially soft core 10 of neutral carbon, a shell 11 of hard carbon around the core, and a conductive coating 12 of copper around the shell. Each carbon stick is provided at one of its ends with a longitudinal socket 14 and its other end with a stem 15 which constitute, respectively, female and male members of a telescopic joint for end-to-end connection of similar sticks. The inner periphery of the socket 14 and the outer periphery of the male member 15 are preferably formed in the hard carbon of the shell 11. The end faces 16 of the male and female members are located so that they will substantially abut against each other when the sticks are telescopically joined. At the joint between the two carbon sticks a sleeve 18 of metal of high conductivity, such as copper, is provided to receive and resiliently grip the end portions of a pair of sticks, for providing a continuous path of conduction of current between the coating of the joined sticks. The sleeve is provided with indentations 21 for better gripping the sticks.

For efficient projection of light it is necessary to provide a continuous uniform path for electric current through the copper coating and through the carbon portions of the sticks. In cutting the telescopic ends on the sticks, fragments of the carbon in the cut surfaces sometimes break away and leave them porous which results in an imperfect path for current. Very short ends of a nearly completely consumed stick will, sometimes during continuous projection, become loose and fall apart from the following stick. This will also cause undesirable irregularities in the projected light. It is also desirable to shorten the telescopic ends, to reduce waste. To prevent these irregularities and provide a more secure joint the invention provides for bonding together the telescopically connected ends by a suitable bonding agent such as a thin solution of phenolformaldehyde resin. The male member of the telescopic joint on the end of each stick, when it is joined to a partially consumed stick, is dipped in the resin, so as to leave, as indicated at 20, a sufficient quantity of resin on the stick to form a thin coat between the male and female members of the telescopic joint, when the thinly coated member is inserted into the female member. The resin is spread as the members are joined, and forms a thin but secure bond between the carbon surfaces of the joint. This resin is preferably thermosetting so it will quickly set and form an efficient bond between the sticks which supplements the telescopic joint and the sleeve in securing the sticks together. This thin coating also results in uniform flow of current between the carbon in the joined sticks so that flickering in the projected light is prevented and small ends of consumed sticks will not be separated from the stick of normal length. Additionally, it becomes possible to shorten the telescopic members, to reduce the waste caused by cutting away the carbon in forming the telescopic ends.

The invention provides carbon electrodes for projectors which are adapted to be successively connected together for continuous light projection without resultant flickering in the light or irregularities in the light projected, as the result of small pieces of the electrode being separated as the electrode is consumed across the joint and which makes it possible to use a relatively short telescopic joint to reduce waste.

The invention is not to be understood as restricted to the details set forth since these may be modified within the scope of the appended claim without departing from the spirit and scope of the invention.

Having thus described the invention what I claim as new and desire to secure by Letters Patent is:

That improvement in connecting together for continuous light projection, a pair of stick electrodes, each including a core of soft carbon, a shell of hard carbon around the core, and a conductive coating around the shell, the hard carbon of the sticks being provided with telescopic male and female ends, which comprises applying a thin solution of phenol formaldehyde resin to one of the telescopic ends, joining the telescopic mating ends of the pair of sticks together and spreading the resin to form a thin coating which bonds together the hard carbon in the sticks, and additionally connecting the sticks with a sleeve of electric conducting material in order to effect electrical conduction between the conductive coatings.

JOSEPH W. DROLL.